(12) United States Patent
Lee

(10) Patent No.: US 9,438,863 B2
(45) Date of Patent: Sep. 6, 2016

(54) LOCATION RECOGNITION APPARATUS AND METHOD

(71) Applicant: NULSOM, INC., Daejeon (KR)

(72) Inventor: Chang-Hoon Lee, Daejeon (KR)

(73) Assignee: NULSOM INC., Daejeon (KR)

( * ) Notice: Subject to any disclaimer, the term of this patent is extended or adjusted under 35 U.S.C. 154(b) by 230 days.

(21) Appl. No.: 14/349,980

(22) PCT Filed: Oct. 5, 2012

(86) PCT No.: PCT/KR2012/008108
§ 371 (c)(1),
(2) Date: Apr. 4, 2014

(87) PCT Pub. No.: WO2013/051905
PCT Pub. Date: Apr. 11, 2013

(65) Prior Publication Data
US 2014/0232866 A1    Aug. 21, 2014

(30) Foreign Application Priority Data

Oct. 6, 2011    (KR) .......................... 10-2011-0101744

(51) Int. Cl.
*H04N 7/18* (2006.01)
*G01S 5/16* (2006.01)
*G01S 1/70* (2006.01)

(52) U.S. Cl.
CPC . *H04N 7/18* (2013.01); *G01S 1/70* (2013.01); *G01S 5/16* (2013.01)

(58) Field of Classification Search
CPC .......................................................... H04N 7/18
USPC ........................................................... 348/143
See application file for complete search history.

(56) References Cited

U.S. PATENT DOCUMENTS

| | | | | |
|---|---|---|---|---|
| 2004/0213449 A1* | 10/2004 | Safaee-Rad | ........... | G06T 7/0004 382/141 |
| 2007/0043523 A1* | 2/2007 | Lai | .......... | G09G 3/006 702/67 |

FOREIGN PATENT DOCUMENTS

| | | |
|---|---|---|
| JP | 2003-035515 A | 2/2003 |
| JP | 2006-084195 A | 3/2006 |
| KR | 10-2009-0020852 A | 2/2009 |
| KR | 10-2011-0069902 A | 6/2011 |

* cited by examiner

*Primary Examiner* — Richard Torrente
(74) *Attorney, Agent, or Firm* — Paratus Law Group, PLLC

(57) ABSTRACT

A position recognition apparatus and method for determining the position of an object by using a camera are provided. The object may include a controllable light source, and the position recognition apparatus may store identification information of the object. The position recognition apparatus may obtain a spatial image by capturing an image of a place where the object is located, may extract the position of the object by processing the spatial image, and may correlate the extracted position with the object, thereby completing a position map.

9 Claims, 4 Drawing Sheets

|  | A | B | C | D | E | F |
|---|---|---|---|---|---|---|
| 1st | ☼ | ☼ | ☼ | ☼ |  |  |
| 2nd |  |  | ☼ | ☼ | ☼ |  |
| 3rd | ☼ |  | ☼ |  |  | ☼ |

LOCATION RECOGNITION APPARATUS AND METHOD

This application is a National Stage of International Application No. PCT/KR2012/008108, filed Oct. 5, 2012, and claims priority to and the benefit of Korean Application No. 10-2011-0101744, filed on Oct. 6, 2011, the disclosures of which are incorporated herein by reference in its entirety.

BACKGROUND

1. Field of the Invention

Embodiments relate to a position recognition apparatus and method in which the position of an object is sensed by using a camera, and more particularly, to a position recognition apparatus and method for determining the position of an object having a controllable light source, in which a position map is generated by capturing an image of a place where the object is located as a spatial image, processing the spatial image so as to extract the position of the object and correlating the extracted position with identification information present in the position recognition apparatus.

2. Description of the Related Art

There are various camera-aided object identification techniques such as a technique of determining the position of a light-emitting object by identifying the light source of the light-emitting object. To determine the position of the light-emitting object, the light source of the light-emitting object may be set in advance to emit predetermined light for identification. However, the setting of the light-emitting object to emit the predetermined identification light may be time-consuming and costly, and if the light-emitting object is not properly set, the determined position may not be able to be correlated with the light-emitting object.

SUMMARY

Embodiments provide a position recognition apparatus and method capable of correlating the position of a light source with a light-emitting body without the need for the light-emitting body to emit predetermined light for identification.

However, embodiments are not restricted to the one set forth herein. The above and other embodiments will become more apparent to one of ordinary skill in the art to which the present invention concept pertains by referencing the detailed description of the embodiments given below.

According to embodiments, position recognition method, includes: transmitting an indicator signal indicating whether and which of a plurality of light emitters emit light, wherein the plurality of light-emitters are located in a predetermined image-capturing region for an image-capturing unit and each have identification information; obtaining a spatial image by capturing an image of the image-capturing region; detecting predetermined light for identification from at least one of the plurality of light emitters by analyzing the spatial image; calculating at least one spatial coordinate corresponding to the at least one of the plurality of light emitters; and correlating the at least one spatial coordinate with the identification information of the at least one of the plurality of light emitters.

According to other embodiments, a position recognition apparatus, includes: a communication unit configured to transmit an indicator signal indicating whether and which of a plurality of light emitters emit light, wherein the plurality of light-emitters are located in a predetermined image-capturing region for an image-capturing unit and each have identification information; an image capturing unit configured to obtain a spatial image by capturing an image of the image-capturing region; a light source detection unit configured to detect predetermined light for identification from at least one of the plurality of light emitters by analyzing the spatial image; a coordinate calculation unit configured to calculate at least one spatial coordinate corresponding to the at least one of the plurality of light emitters; a coordinate correlation unit configured to correlate the at least one spatial coordinate with the identification information of the at least one of the plurality of light emitters; and a storage unit configured to store the results of the correlation performed by the coordinate correlation unit as one or more items of a correlation list.

According to other embodiments, a light emitter, includes: a light emission unit configured to emit light; a communication unit configured to communicate with a position recognition apparatus; a storage unit configured to store identification information; and a driving unit configured to control the light emission unit to emit light in response to receipt of a control signal including the identification information via the communication unit.

According to other embodiments, a position recognition system includes a plurality of light emitters and a position recognition apparatus.

According to the present inventive concept, the relative position of each object having a light source can be determined based on identification information of each object even when they are randomly arranged. Accordingly, the amount of time and effort that it takes to install target objects to be positioned can be reduced. In addition, the present inventive concept can be applied to various fields, for example, logistics systems, the display of images (such as card sections), and advertising. Light emitters for use in the present inventive concept can replace luminous lights for use in various events such as concerts.

Other features and aspects will be apparent from the following detailed description, the drawings, and the claims.

DETAILED DESCRIPTION OF THE EMBODIMENTS

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Embodiments will hereinafter be described in detail with reference to the accompanying drawings.

Figure 1:
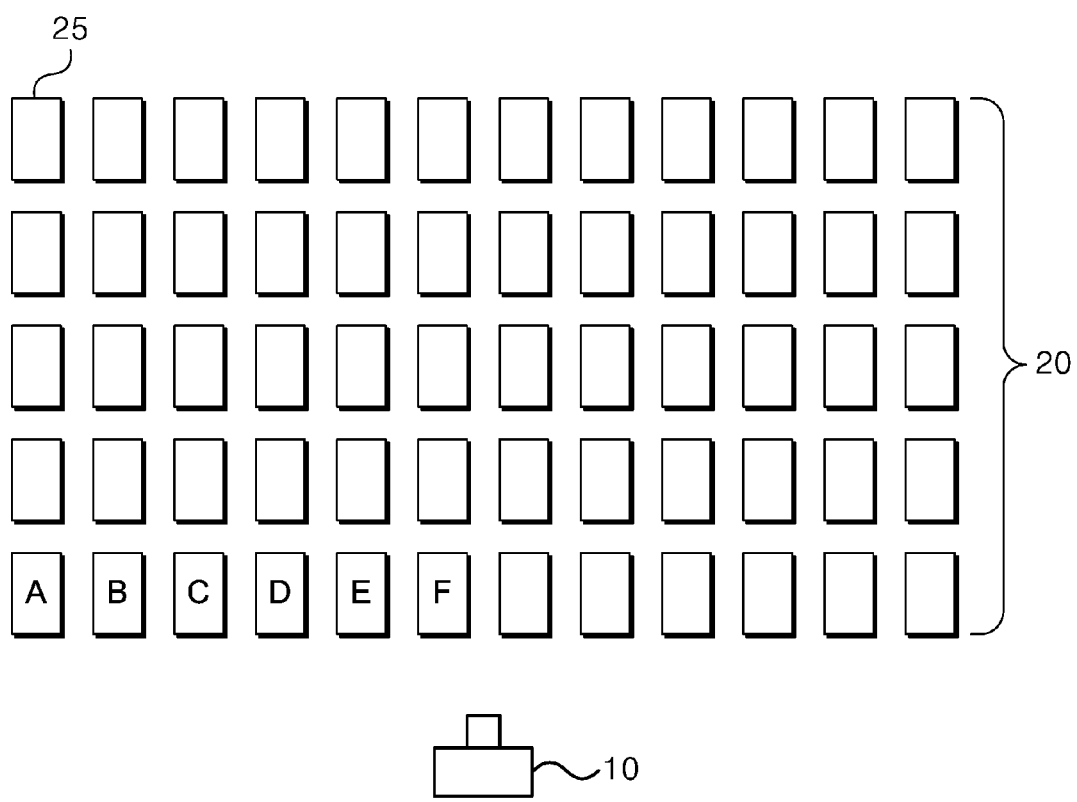
FIG. 1 is a schematic diagram illustrating a position recognition system according to an embodiment.
Figure 2:
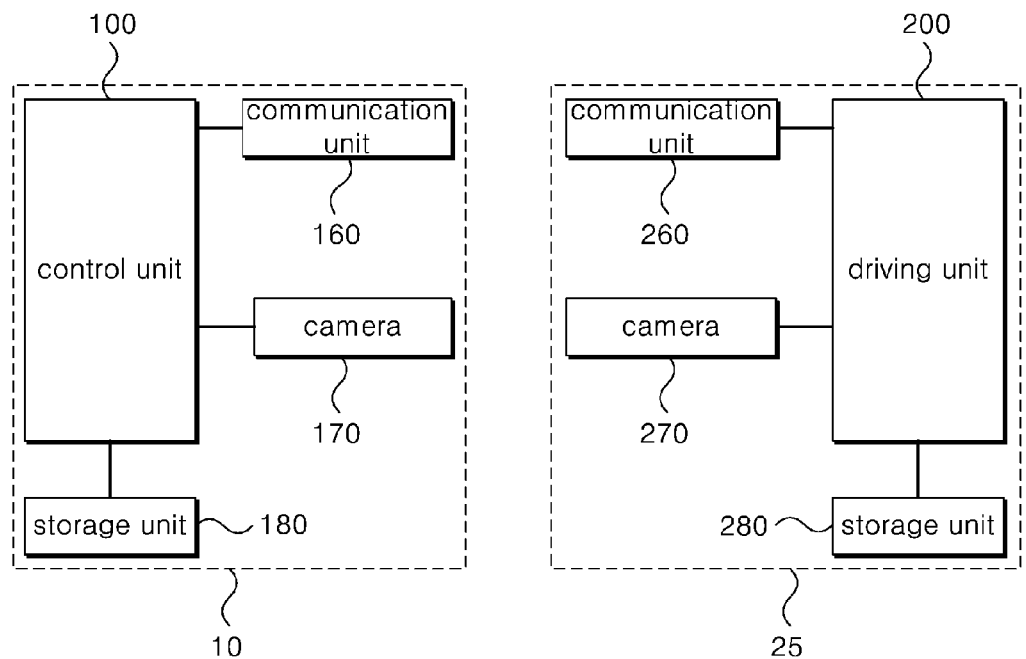
FIG. 2 is a block diagram illustrating a position recognition apparatus according to an embodiment and a light emitter.
Figure 3:
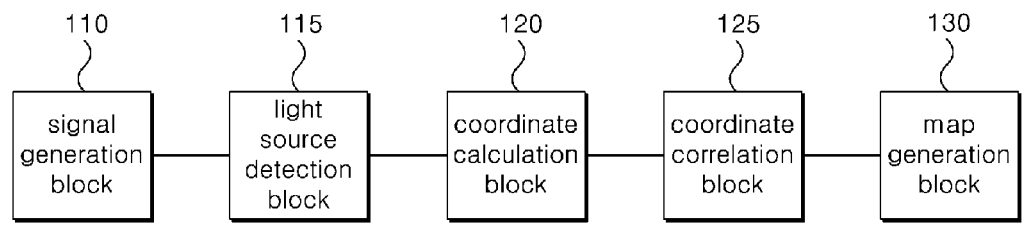
FIG. 3 is a detailed block diagram illustrating a control unit illustrated in FIG. 2.
Figure 4:
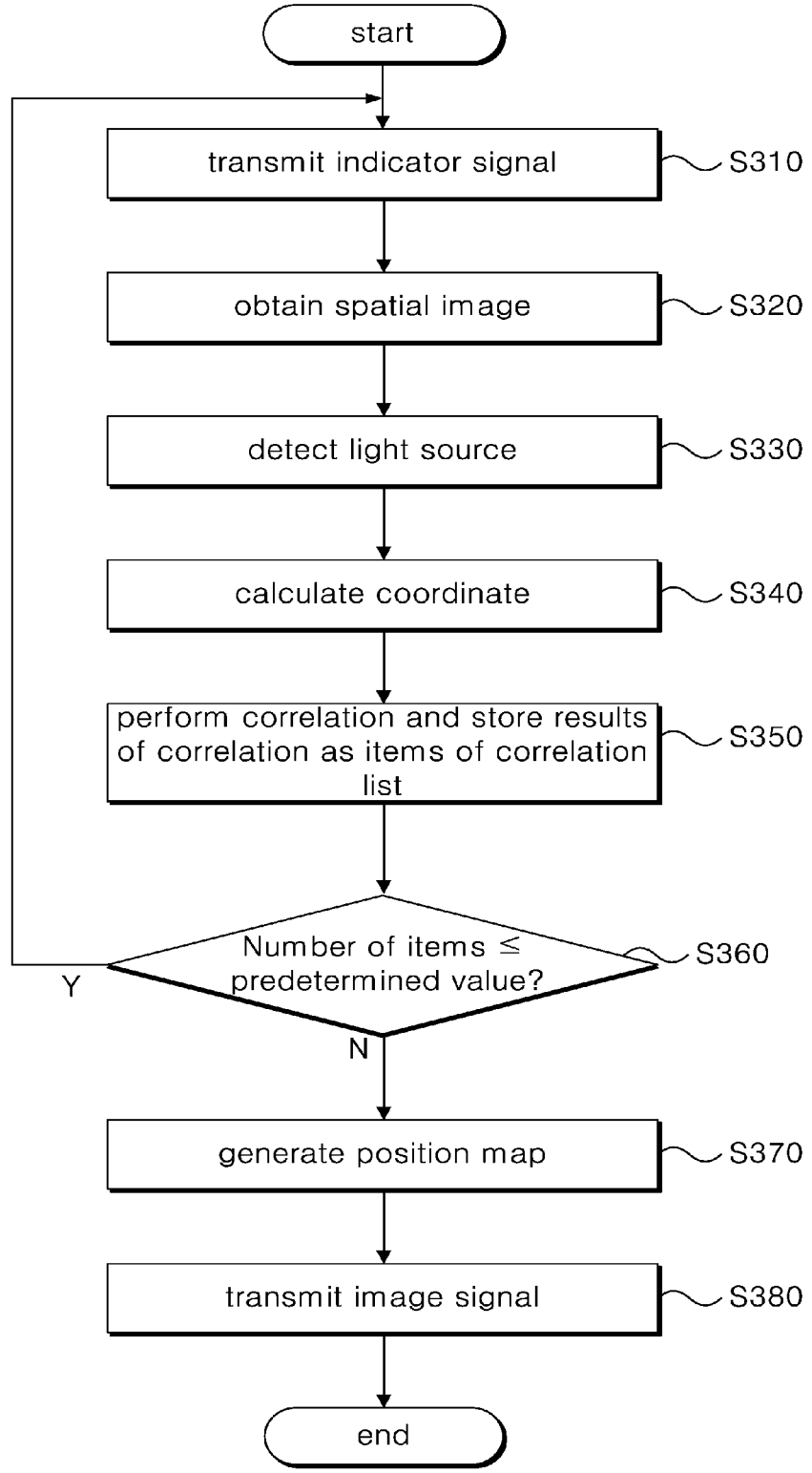
FIG. 4 is a flowchart illustrating a position recognition method according to an embodiment.
Figures 5, 6:
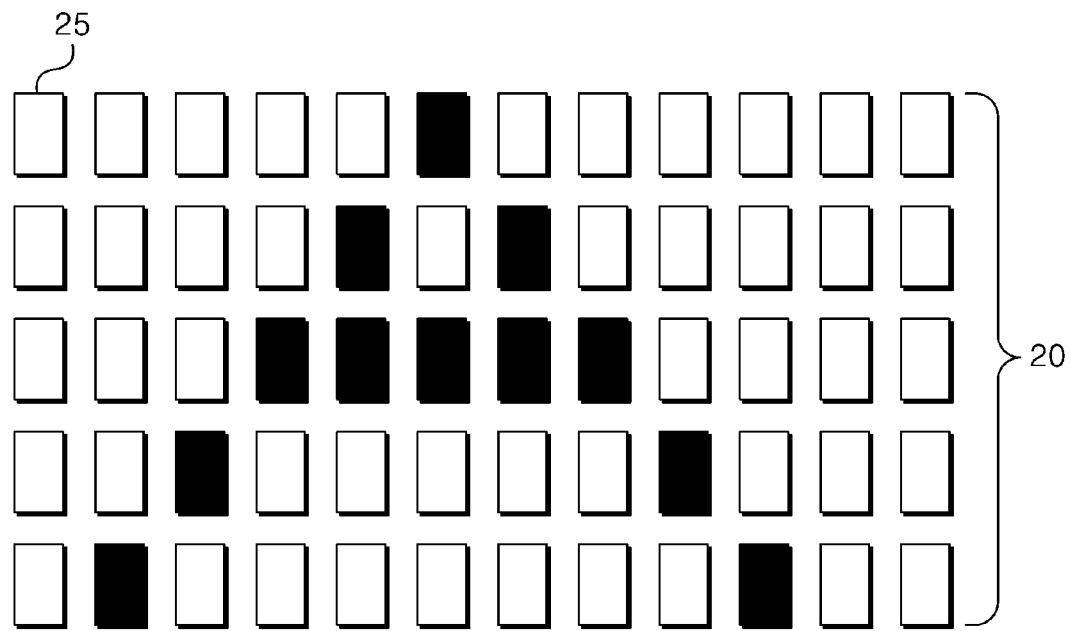
FIG. 5 is a schematic diagram illustrating an image realized by a plurality of light emitters, according to an embodiment.
FIG. 6 is a table showing groups of light emitters as used in a method of creating a correlation list according to an embodiment.

FIG. 1 is a schematic diagram illustrating a position recognition system according to an embodiment, FIG. 2 is a block diagram illustrating a position recognition apparatus according to an embodiment and a light emitter, FIG. 3 is a detailed block diagram illustrating a control unit illustrated in FIG. 2, FIG. 4 is a flowchart illustrating a position recognition method according to an embodiment, and FIG. 5 is a schematic diagram illustrating an image realized by a plurality of light emitters, according to an embodiment.

Referring to FIGS. 1 to 3, a position recognition system includes a light emitting apparatus 20 and a position recognition apparatus 10. The light emitting apparatus 20 may include a plurality of light emitters 25, and the light emitters 25 may be irregularly arranged.

The light emitters 25, which emit light, may be devices fabricated exclusively for the present inventive concept. Examples of the light emitters 25 may include mobile terminals equipped with light-emitting displays, such as mobile phones, smart phones, personal digital assistants (PDAs), portable multimedia players (PMPs), tablet computers, etc. Examples of the light emitters 25 may also include devices equipped with large-scale, or fixed light sources, such as glass windows that transmit therethrough light from the inside of a building.

Referring to FIG. 2, a light emitter 25 may include a driving unit 200, a communication unit 260, a light-emitting unit 270, and a storage unit 280.

The light-emitting unit 270 may include a light source which emits light under the control of the driving unit 200. A unicolor light-emitting diode (LED) module, a multicolor LED module, a backlight for a liquid crystal display (LCD), or an organic LED (OLED) lighting may be used as the light source of the light-emitting unit 270.

The storage unit 280 may store programs necessary for the driving unit 200 to perform various processes, and may temporarily store various input and output data. The storage unit 280 may store identification information of the light emitter 25. The identification information allows the light emitter 25 to be distinguished from other light emitters 25. The storage unit 280 may include a radio frequency (RF) tag storing the identification information. The storage unit 280 may also include a bar code representing the identification information.

The communication unit 260 may transmit signals to, or receive signals from, an external device. The communication unit 260 may be a wired device, a wireless device, or a combination thereof. The communication unit 260 may receive a signal from the position recognition apparatus 10, and may output the received signal to the driving unit 200. The communication unit 260 may transmit the identification information present in the storage unit 280 to the position recognition apparatus 10.

The communication unit 260 may include a near-field communication module and a remote-field communication module. The near-field communication module may include an RF tag or a bar code, and may be used to transmit the identification information to the position recognition apparatus 10. In this example, the remote-field communication module may include a receiver only.

The driving unit 200 controls the elements of the light emitter 25 so as to control the general operation of the light emitter 25. The driving unit 200 may interpret a signal received from the communication unit 260, and may control the turning on or off of the light source of the light-emitting unit 270 based on the results of the interpretation.

The driving unit 200 may control the turning on or off of the light source of the light-emitting unit 270 so that the light-emitting unit 270 may serve as means for outputting data. More specifically, the driving unit 200 may control the turning on or off of the light source of the light-emitting unit 270 in such a manner that the identification information present in the storage unit 280 may be recognized by the position recognition apparatus 10. The driving unit 200 may use a pulse width modulation (PWM) method, a pulse position modulation (PPM) method, a pulse code modulation (PCM) method or a pulse number modulation (PNM) method to control the turning on or off of the light source of the light-emitting unit 270.

The position recognition apparatus 10 may include a control unit 100, a communication unit 160, a camera 170 and a storage unit 180.

The communication unit 160 may transmit information to, or receive information from, the light-emitting apparatus 20. The communication unit 160 may receive identification information from the light-emitting apparatus 20. In response to a wired communication method being used, serial number information of each of the ports (not illustrated) of the light emitters 25, which are connected to the position recognition apparatus 10, may be used as identification information of each of the light emitters 25.

The communication unit 160 may transmit a control signal for controlling the light sources of the light emitters 25 to the light-emitting apparatus 20. In response to a wireless communication method being used, the control signal may be broadcast to each of the light emitters 25. Identification information of each of the light emitters 25 may be included in the control signal so as to individually control the turning on or off of each of the light emitters 25.

The camera 170 obtains a spatial image by capturing an image of the light-emitting apparatus 20, which is disposed in a predetermined image-capturing region, and outputs the spatial image to the control unit 100. The spatial image may be a still image or a moving image. The camera 170 may include a plurality of image-capturing means, a fisheye camera or a pan tilt camera capable of capturing a panoramic image. The camera 170 may capture an image of the light-emitting apparatus 20 while moving from one place to another.

The storage unit 180 may store programs necessary for the control unit 100 to perform various processes, and may temporarily store various input and output data. The storage unit 180 may store identification information of each of the light emitters 25.

The control unit 100 controls the elements of the position recognition apparatus 10 so as to control the general operation of the position recognition apparatus 10.

Referring to FIG. 3, the control unit 100 may include a signal generation block 110, a light source detection block 115, a coordinate calculation block 120, a coordinate correlation block 125, and a map generation block 130. The operation of the control unit 100 will hereinafter be described with reference to FIGS. 3 and 4.

Referring to FIGS. 3 and 4, the signal generation block 110 may generate an indicator signal, which includes a light emission signal for enabling one or more target light emitters 25 to emit light and identification information of the target light emitters 25, and may output the indicator signal via the communication unit 160 (S310).

The indicator signal may include a light emission signal for turning off one or more target light emitters 25 that are currently on and identification information of the target light emitters 25. The indicator signal may also include a control signal for controlling one or more target light emitters 25 to emit light for a predetermined amount of time and then to be turned off.

The indicator signal may include data for enabling the light emitters 25 to be turned on or off in accordance with their respective identification information. In this example, the control unit 100 may control the camera 170 to capture a moving image of the light emitters 25. To cause no image processing error, the duration for which the light emitters 25 are turned on or off may be set to be longer than the interval at which the camera 170 captures an image.

In response to the indicator signal being output, the camera 170 may obtain a spatial image by capturing an image of a predetermined area (S320). It is assumed that the light sources of the light emitters 25 are no flickering lights. Since the light sources of the light emitters 25 are no flickering lights, the camera 170 may be configured to capture a still image of the predetermined area so as not to cause too much load on image processing.

The light source detection block 115 may detect one or more light sources from the spatial image obtained by the camera (S330). The light source detection block 115 may use various well-known image processing techniques. For example, the light source detection block 115 may use histogram analysis to extract only bright dots from the spatial image obtained by the camera 170.

The coordinate calculation block 120 may calculate the spatial coordinates of the detected light sources (S340). The number of spatial coordinates calculated corresponds to the number of light sources detected.

The coordinate correlation block 125 may correlate the calculated spatial coordinates with identification information, and may store the results of the correlation in the storage unit 180 as an item of a correlation list (S350). If two or more light emitters are detected, a group of the light emitters may be correlated with a group of spatial coordinates calculated.

The map generation block 130 may determine whether the number of items of the correlation list exceeds a predetermined value (S360). In response to the number of items of the correlation list being less than the predetermined value, the map generation block 130 may control the signal generation block 110 to generate a new indicator signal (S310). In response to the number of items of the correlation list being the same as or greater than the predetermined value, the map generation block 130 may generate a position map based on the identification information of the detected light emitters and the spatial coordinates of the detected emitters (S370).

In response to the light emitters 25 being irregularly arranged, the position map may be generated by reducing the interval between the coordinates of a pair of adjacent points that can be extracted, or determining the relative positions of the light sources of the light emitters 25 with respect to a particular location.

In response to the position map being generated, the signal generation block 110 may transmit an image signal for enabling the light emitters 25 to realize a predetermined image (S380). The image signal may be generated by a block, other than the signal generation block 110. The image signal may enable one or more light emitters 25 to emit light and thus to render a predetermined image (for example, an image of the alphabet letter "A"), as illustrated in FIG. 5.

In response to the light emitters 25 being irregularly arranged, a desired image may be able to be properly rendered, and thus, a similar image to the desired image may be rendered instead to deceive the human eye.

FIG. 6 is a table showing groups of light emitters as used in a method of creating a correlation list according to an embodiment. For convenience, it is assumed that there are only provided six light emitters A, B, C, D, E and F.

The generation of a correlation list will hereinafter be described with reference to FIG. 6. Referring to FIG. 6, the position recognition apparatus 10 may receive and store identification information of each of the light emitters A to F in advance. The identification information may be stored in the position recognition apparatus 10 in advance via different routes. The number of items of a correlation list to be generated may be set to 3.

The position recognition apparatus 10 may control the light emitters A, B, C, and D to emit light, and may extract spatial coordinates P1, P2, P3 and P4 by processing a spatial image obtained by the camera 170. The identification information of each of the light emitters A, B, C and D and the spatial coordinates P1, P2, P3 and P4 may be stored as a first item of a correlation list as follows: item1={A, B, C, D} & {P1, P2, P3, P4}.

Thereafter, the position recognition apparatus 10 may control the light emitters C, D and E to emit light and may extract the spatial coordinates P1 and P4 and a spatial coordinate P5 by processing a spatial image obtained by the camera 170. The identification information of each of the light emitters C, D and E and the spatial coordinates P1, P4 and P4 may be stored as a second item of the correlation list as follows: item2={C, D, E} & {P1, P4, P5}.

Thereafter, the position recognition apparatus 10 may control the light emitters A, C and F to emit light and may extract the spatial coordinates P1 and P3 and a spatial coordinate P6 by processing a spatial image obtained by the camera 170. The identification information of each of the light emitters A, C and F and the spatial coordinates P1, P3 and P6 may be stored as a second item of the correlation list as follows: item2=item3 ={A, C, F} & {P1, P3, P6}.

Since the number of items of the correlation list is set to 3, no more items may be extracted. The map generation block 130 maps the light emitters A, B, C, D, E and F and their respective spatial coordinates by using the first, second and third items. For example, since the first, second and third items all share the light emitter C and the spatial coordinate P1, the spatial coordinate P1 may be determined to be the coordinate of the light emitter C. Since the first and third items share the light emitter A and the spatial coordinate P3, the spatial coordinate P3 may be determined to be the coordinate of the light emitter A. The light emitter D, which is included in both the first and second items, the light emitter B, which is included in the first item only, the light emitter E, which is included in the second item only, and the light emitter F, which is included in the third item only, may be paired with the spatial coordinates P5, P2, P4 and P6, respectively. As a result, a position map may be generated as follows:

(A, P3) (B, P2) (C, P1) (D, P5) (E, P4) (F, P6).

The position map may be generated by using various algorithms. The position map is generated by turning on more than one light emitter at the same time, extracting one or more spatial coordinates and correlating the turned-on light emitters with the extracted spatial coordinates. Accordingly, the number of images that need to be taken may be reduced, and thus, the amount of time that it takes to generate a position map may also be reduced.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A position recognition method, comprising:
   transmitting an indicator signal to a plurality of light emitters, wherein the plurality of light emitters are located in a predetermined image-capturing region for an image-capturing unit, are arranged irregularly, and each have identification information, and wherein the indicator signal includes a light emission signal for enabling at least one target light emitter of the plurality of light emitters to emit light and identification information of the at least one target light emitter, and the indicator signal includes no position information of the at least one target light emitter;
   obtaining a spatial image by capturing an image of the image-capturing region;
   detecting at least one light source from the at least one target light emitter which emits the light in response to the transmitted indicator signal by analyzing the spatial image;
   calculating at least one spatial coordinate corresponding to the detected at least one light source; and
   correlating the at least one spatial coordinate with the transmitted identification information of the at least one target light emitter.

2. The position recognition method of claim 1, wherein the identification information is received from each of the plurality of light emitters via a communication unit which communicates with each of the plurality of light emitters prior to transmitting the indicator signal.

3. The position recognition method of claim 1, further comprising:
   storing results of the correlating as one or more items of a correlation list; and
   in response to the number of items of the correlation list exceeding a predetermined value, generating a position map of the plurality of light emitters based on the correlation list.

4. The position recognition method of claim 3, wherein if there are three or more light emitters, the number of items of the correlation list is less than the number of the plurality of light emitters.

5. The position recognition method of claim 3, further comprising:
   setting a predetermined image on the position map and transmitting an image signal to each of the plurality of light emitters such that an image corresponding to the image signal can be generated and displayed in the image-capturing region.

6. The position recognition method of claim 1, wherein the indicator signal further includes a control signal controls the light source of the at least one target light emitter corresponding to the transmitted identification information to emit a predetermined identification light and the predetermined identification light distinguishes the at least one target light emitter from other light emitters, and wherein the calculating comprises calculating the at least one spatial coordinate corresponding to the at least one target light emitter emitting the predetermined identification light, and the correlating comprises correlating the calculated spatial coordinate with the at least one target light emitter emitting the predetermined identification light.

7. A position recognition apparatus, comprising:
   a communication unit configured to transmit an indicator signal to a plurality of light emitters, wherein the plurality of light emitters are located in a predetermined image-capturing region for an image-capturing unit, are arranged irregularly, and each have identification information, and wherein the indicator signal includes a light emission signal for enabling at least one target light emitter of the plurality of light emitters to emit light and identification information of the at least one target light emitter and the indicator signal includes no position information of the at least one target light emitter;
   an image capturing unit configured to obtain a spatial image by capturing an image of the image-capturing region;
   a light source detection unit configured to detect at least one light source from the at least one target light emitter which emits the light in response to the transmitted indicator signal by analyzing the spatial image;
   a coordinate calculation unit configured to calculate at least one spatial coordinate corresponding to the detected at least one light source;
   a coordinate correlation unit configured to correlate the at least one spatial coordinate with the transmitted identification information of the at least one target light emitter; and
   a storage unit configured to store results of a correlation performed by the coordinate correlation unit as one or more items of a correlation list.

8. The position recognition apparatus of claim 7, further comprising:
   a map generation unit configured to generate a position map of the plurality of light emitters based on the correlation list in response to the number of items of the correlation list exceeding a predetermined value.

9. A light emitter, comprising:
   a light emission unit configured to emit light;

a communication unit configured to communicate with a position recognition apparatus;

a storage unit configured to store identification information; and a driving unit configured to control the light emission unit to emit light in response to a receipt of an indicator signal including the identification information via the communication unit, wherein the position recognition apparatus comprises:

a communication unit configured to transmit the indicator signal to a plurality of light emitters, wherein the plurality of light emitters are located in a predetermined image-capturing region for an image-capturing unit, are arranged irregularly, and each have identification information, and wherein the indicator signal includes a light emission signal for enabling at least one target light emitter of the plurality of light emitters to emit light and identification information of the at least one target light emitter, and the indicator signal includes no position information of the at least one target light emitter;

an image capturing unit configured to obtain a spatial image by capturing an image of the image-capturing region;

a light source detection unit configured to detect at least one light source from the at least one target light emitter which emits the light in response to the transmitted indicator signal by analyzing the spatial image;

a coordinate calculation unit configured to calculate at least one spatial coordinate corresponding to the detected at least one light source;

a coordinate correlation unit configured to correlate the at least one spatial coordinate with the transmitted identification information of the at least one target light emitter; and a storage unit configured to store results of a correlation performed by the coordinate correlation unit as one or more items of a correlation list.

\* \* \* \* \*